UNITED STATES PATENT OFFICE.

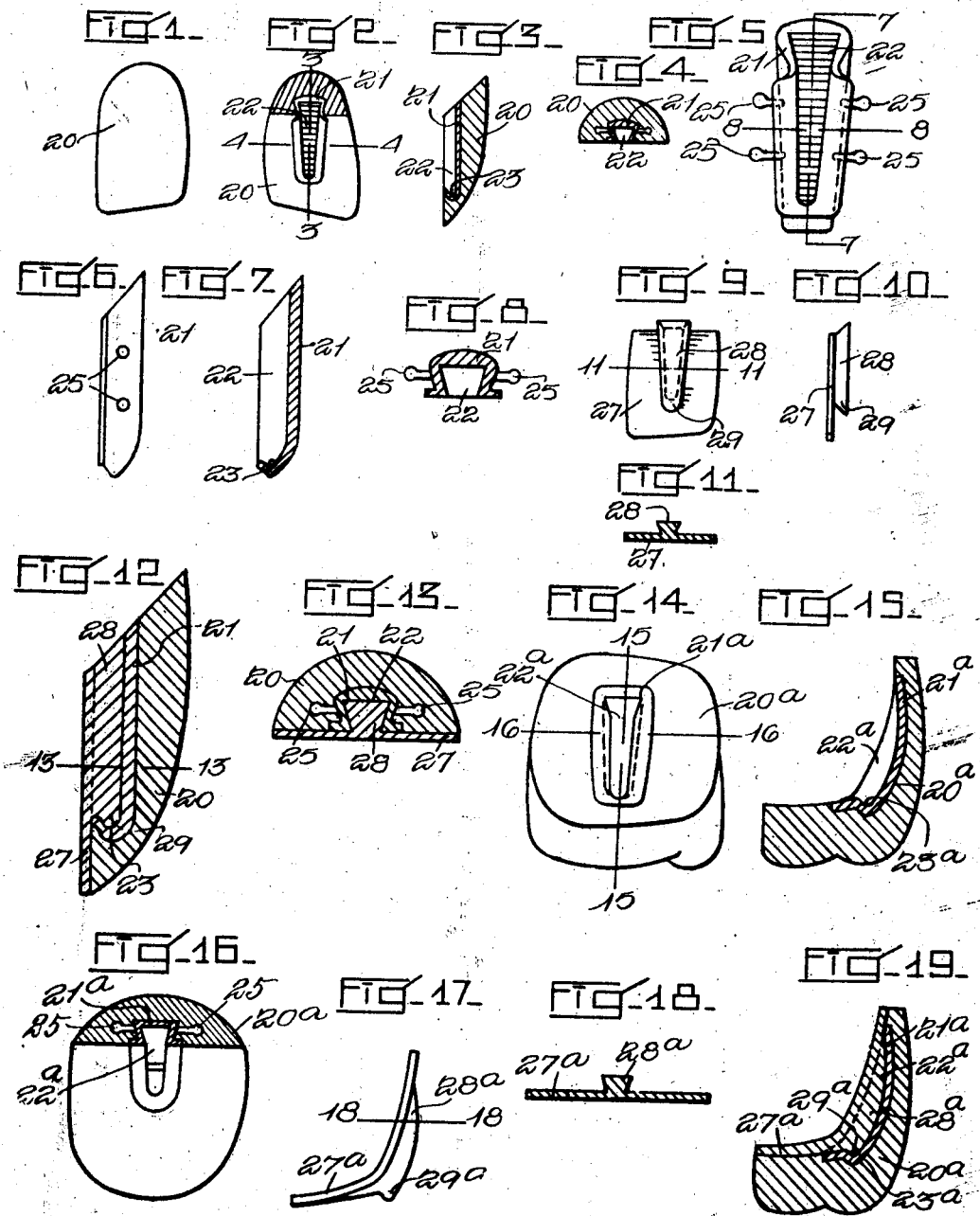

SIMON MYERSON, OF CAMBRIDGE, MASSACHUSETTS.

ARTIFICIAL TOOTH.

1,189,164.  Specification of Letters Patent.  Patented June 27, 1916.

Application filed March 10, 1916. Serial No. 83,273.

*To all whom it may concern:*

Be it known that I, SIMON MYERSON, a citizen of the United States, residing at Cambridge, in the county of Middlesex and State of Massachusetts, have invented new and useful Improvements in Artificial Teeth, of which the following is a specification.

This invention relates to an artificial tooth including a removable or replaceable body portion of porcelain having a socket in its posterior portion, and a metallic backing formed to bear on a posterior surface of the body and provided with a tenon formed to closely fit said socket, and coöperate with one end of the latter in resisting forces of mastication.

The chief object of the invention is to compensate for the loss of strength and cross sectional area of the body by invasion of its material due to the formation of the socket therein, without unduly increasing the bulk of the body.

The invention is embodied in a removable or replaceable tooth portion and a metallic backing therefor, formed to accomplish said object, the said removable portion comprising a porcelain body and a metallic reinforcing member embedded in the posterior portion of said body and provided with a socket which is closed at one end and is open at the posterior surface of the body, said reinforcing member compensating for the reduction of the cross sectional area of the body due to its invasion by said socket, and being provided with anchoring means resisting strain tending to crack the body at its anterior surface.

The invention is also embodied in other improvements hereinafter described and claimed.

Of the accompanying drawings forming a part of this specification; Figure 1 represents a front view of an incisor tooth embodying my invention; Fig. 2 represents a rear view of the same; Fig. 3 represents a section on line 3—3 of Fig. 2; Fig. 4 represents a section on line 4—4 of Fig. 2; Fig. 5 represents an enlarged rear view of the reinforcing member; Fig. 6 represents an edge view of the same; Fig. 7 represents a section on line 7—7 of Fig. 5; Fig. 8 represents a section on line 8—8 of Fig. 5; Fig. 9 represents a side view and Fig. 10 an edge view of the backing; Fig. 11 represents a section on line 11—11 of Fig. 9; Fig. 12 represents a longitudinal section showing the body, reinforcing member and backing assembled; Fig. 13 represents a section on line 13—13 of Fig. 12; Fig. 14 represents a rear view of a molar tooth body embodying the invention; Fig. 15 represents a section on line 15—15 of Fig. 14; Fig. 16 represents a section on line 16—16 of Fig. 14; Fig. 17 represents an edge view of the molar body backing; Fig. 18 represents a section on line 18—18 of Fig. 17; Fig. 19 represents a longitudinal section showing the molar body, reinforcing body and backing assembled.

The same reference characters indicate the same or similar parts in all the views.

Referring first to Figs. 1 to 13 inclusive, 20 represents an incisor tooth body of porcelain, having a flat posterior surface, and an inclined ridge lap. 21 represents a metallic reinforcing member embedded in the posterior portion of the body and provided with a longitudinal socket 22 which is preferably longitudinally tapered and dovetailed as shown, said member having lateral flanges flush with the lingual face of the tooth body. The socket opens rearwardly on the lingual face of the body, and one of its ends opens on the inclined ridge lap, its opposite end or that nearest the incisal edge of the body being closed and adapted to be seated on the tenon hereinafter described, said closed end being preferably provided with a pit 23 constituting an extension of the inner portion of the socket toward the incisal edge.

In practice the porcelain of the body is preferably molded on the reinforcing member while in a plastic condition and is solidified thereon by baking. The reinforcing member is preferably of dovetail form externally, as shown by Figs. 4, 8, and 13, so that it is engaged or interlocked with the body against lateral separation.

The insert or reinforcing member is preferably provided with anchoring pins or projections 25 which engage the body to prevent displacement, said projections also acting as transverse straps increasing the strength of the body and its resistance to strain tending to cause it to crack between the reinforcing member and the anterior surface of the body.

The socketed reinforcing member embedded in the posterior portion of the body reduces to the minimum the invasion of the porcelain by the socket and enables the socket to be made of minimum depth, so that suitable strength is insured without an objectionably large bulk or cross sectional area of the body.

27 represents a metallic backing formed to cover the posterior surface of the body and provided with a tenon 28 formed to closely fit the socket 22, and abut against the closed end thereof, one end of the tenon being preferably provided with an extension 29 entering the socket pit 23, and coöperating with the dovetailed body of the tenon in preventing lateral displacement of the body.

The outer end of the tenon is inclined and flush with the inclined base surface of the body, so that it may be ground away or reduced therewith whenever this is necessary.

The tenon is insertible in the outer end of the socket and the reinforced body is therefore removable or replaceable by an endwise movement relatively to the backing and tenon.

Figs. 14 to 18 show the invention embodied in a molor tooth, 20ª representing the body, and 21ª the reinforcing member incorporated therein, said member having a socket 22ª, the closed end of which is provided with a pit 23ª.

The backing 27ª has a tenon 28ª formed to fit the socket, and a tenon extension 29ª formed to enter the pit 23ª.

By the term "immovably embedded" employed in the specification and claims is meant that the insert or reinforcing member is immovably fixed within the porcelain tooth body, in any desired manner, preferably by embedding the same in the porcelain body before the latter is baked, and by the baking process causing the same to become substantially an integral immovable part of said body.

Having described my invention, I claim:

1. An artificial tooth comprising a porcelain body, an insert member immovably embedded in said body to reinforce the same, and provided with a socket closed at one end and having a rear opening extending to the lingual face of the body, said insert member having laterally extended anchoring portions embedded in the material forming the body of the tooth.

2. An artificial tooth comprising a porcelain body, an insert member immovably embedded in said body to reinforce the same, and provided with a socket closed at one end and having a rear opening extending to the lingual face of the body, the opposite sides of said insert being provided with lateral anchoring pins immovably embedded within the material forming said body and extending in opposite directions.

3. An artificial tooth comprising a porcelain body and a metallic insert immovably embedded in said body to reinforce the same, and provided with a socket which is closed at one end and is open at the lingual face of the body, the closed end of the socket being provided with a pit, and a metallic backing having a tenon fitting said socket and abutting on the closed end thereof, said tenon having an extension entering said pit.

4. An artificial tooth comprising a porcelain body, an insert member embedded in said body to reinforce the same, and provided with a socket closed at one end and having a rear opening extending to the lingual face of the body, said insert member having immovably embedded lateral flanges flush with the lingual face of the tooth body.

5. An artificial tooth comprising a porcelain body, an insert member embedded in said body to reinforce the same, and provided with a socket closed at one end and having a rear opening extending to the lingual face of the body, said insert member having lateral flanges flush with the lingual face of the tooth body, and anchoring pins projecting laterally from the sides of said insert member and embedded in the tooth body and spaced from said flanges.

6. An artificial tooth comprising a porcelain body having a flat lingual face and a ridge lap, a metallic insert member embedded in the body to reinforce the same, said insert member being provided with a longitudinally tapered dovetailed socket which is closed at one end and open at the opposite end on said ridge lap, the socket also opening laterally on said lingual face, and a metallic backing formed to cover said lingual face and provided with a longitudinally tapered dovetailed tenon fitting said socket, said tenon being insertible in the open end of the socket and formed to abut against the closed end thereof.

In testimony whereof I have affixed my signature.

SIMON MYERSON.